US008545195B2

(12) United States Patent
Barton

(10) Patent No.: US 8,545,195 B2
(45) Date of Patent: Oct. 1, 2013

(54) HYDROGEN GENERATOR WITH PUMP

(75) Inventor: Russell H. Barton, New Westminster (CA)

(73) Assignee: Eveready Battery Co., Inc., St. Louis, MO (US)

( * ) Notice: Subject to any disclaimer, the term of this patent is extended or adjusted under 35 U.S.C. 154(b) by 35 days.

(21) Appl. No.: 13/278,594

(22) Filed: Oct. 21, 2011

(65) Prior Publication Data
US 2013/0101910 A1   Apr. 25, 2013

(51) Int. Cl.
F04B 43/00  (2006.01)
F04B 45/00  (2006.01)
F04B 43/12  (2006.01)
F04B 49/06  (2006.01)
F04B 1/12   (2006.01)
F04B 1/04   (2006.01)
F04B 27/04  (2006.01)
F04B 27/08  (2006.01)
F04B 39/08  (2006.01)
F04B 7/02   (2006.01)
A61L 2/28   (2006.01)
G01D 11/26  (2006.01)
G01N 1/00   (2006.01)
H01M 8/06   (2006.01)
B01J 7/00   (2006.01)
F04B 17/00  (2006.01)

(52) U.S. Cl.
USPC ......... 417/412; 48/61; 429/416; 417/53; 417/269; 417/273; 417/507; 417/508; 417/413.1; 417/44.9; 417/395; 422/119; 422/129; 422/112; 422/236

(58) Field of Classification Search
USPC ............. 417/44.9, 395, 413.1, 44.1, 271, 417/326, 348, 350, 351, 479, 510, 352, 359, 417/360, 361, 396, 397, 398, 405–409, 410.1, 417/423.1, 424.2, 112, 424, 478, 412, 507, 417/508, 269, 273; 48/61; 429/423, 416, 429/510, 512, 515; 310/14; 205/637; 73/262, 73/263, 269, 270, 274, 278, 279, 715, 861.47; 422/112, 236, 119, 129; 251/129.01
See application file for complete search history.

(56) References Cited

U.S. PATENT DOCUMENTS 3,998,103 A    12/1976 Bjorklund et al.
4,236,880 A *  12/1980 Archibald ............... 417/478
(Continued)

FOREIGN PATENT DOCUMENTS

EP    1375419 A2    1/2004
JP    2002257050 A   9/2002
(Continued)

OTHER PUBLICATIONS

Patent Cooperation Treaty (PCT), International Search Report and Written Opinion for Application PCT/US2012/060475 filed Oct. 17, 2012, Mailed Jan. 30, 2013, European Patent Office, Netherlands.

Primary Examiner — Patrick Ryan
Assistant Examiner — Kiran Quraishi
(74) Attorney, Agent, or Firm — Russell H. Toye, Jr.

(57) ABSTRACT

The invention is a hydrogen generator including a pump for pumping a liquid from a reservoir to a reaction area, where the liquid reacts to produce hydrogen gas, and a fuel cell system including the hydrogen generator and a fuel cell stack. The pump is a diaphragm pump with mechanically operated liquid inlet and outlet valves that are opened by cam-operated pushrods, and the pushrods are isolated from the liquid flow-path through the pump by diaphragms. All valves in the liquid flow path between the liquid reservoir and the reaction area are mechanically operated valves.

21 Claims, 3 Drawing Sheets

(56) References Cited

U.S. PATENT DOCUMENTS

| | | |
|---|---|---|
| 4,613,304 A | 9/1986 | Meyer |
| 6,280,867 B1 | 8/2001 | Elias |
| 8,187,758 B2 | 5/2012 | Fisher et al. |
| 2003/0070938 A1 | 4/2003 | Mali |
| 2004/0009392 A1 | 1/2004 | Petillo |
| 2006/0083960 A1 | 4/2006 | Takehana et al. |
| 2007/0011251 A1 | 1/2007 | McNamara et al. |
| 2009/0035152 A1* | 2/2009 | Butterfield ................... 417/53 |
| 2009/0130532 A1 | 5/2009 | Yokozawa et al. |
| 2009/0148321 A1 | 6/2009 | Muramatsu et al. |
| 2009/0200499 A1 | 8/2009 | Muramatsu et al. |
| 2010/0104481 A1* | 4/2010 | Curello et al. ................ 422/112 |

FOREIGN PATENT DOCUMENTS

| | | | |
|---|---|---|---|
| JP | 2007-287475 A | 11/2007 | |
| WO | 2007120757 A2 | 10/2007 | |
| WO | 2011/005443 * | 1/2011 | ............... C09J 4/00 |
| WO | WO2011/005443 * | 1/2011 | ............... C09J 4/00 |
| WO | 2012/058687 A2 | 5/2012 | |

* cited by examiner

HYDROGEN GENERATOR WITH PUMP

BACKGROUND

This invention relates to a hydrogen generator with a pump for pumping liquid reactant, and to a fuel cell system including the hydrogen generator.

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

There are several types of fuel cells, which can be classified in various ways. For example fuel cells can be categorized according to the type of electrolyte used, typically one of five types: proton exchange membrane fuel cell (PEMFC), alkaline fuel cell (AFC), phosphoric-acid fuel cell (PAFC), solid oxide fuel cell (SOFC) and molten carbonate fuel cell (MCFC). Each of these types of fuel cell uses hydrogen and oxygen. Hydrogen is oxidized at the negative electrode, and oxygen is reduced at the positive electrode. Ions pass through an electrically nonconductive, ion permeable separator and electrons pass through an external circuit to provide an electric current.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (a fuel cell stack), and a gas source, such as a gas tank or a gas generator. Gas generators that supply gas to a fuel cell can be an integral part of a fuel cell system, or they can be removably coupled to the fuel cell system. A removable gas generator can be replaced with another one when the gas producing reactants have been consumed. Removable gas generators can be disposable (intended for only a one-time use) or refillable (intended for use multiple times) to replace consumed reactant materials.

It is desirable for removable gas generators to be easily coupled to the fuel cell system to create a gas flow path from the gas generator to the remainder of the fuel cell system without gas leaks at the coupling, and it is also desirable for the gas generator to be free of gas leaks when not coupled to the remainder of the fuel cell system. The coupling between the gas generator and the rest of the fuel cell system can include one or more valves. The valve(s) can be opened and closed manually, valve operation can be controlled by a control system, or the valve(s) can be opened and closed by an actuator that is operated by making or separating components of the coupling. The latter method can be used in quick disconnect couplings, for example, where the valve is opened when the gas generator is coupled to the rest of the system and closed when the gas generator is uncoupled.

Gas generators can use a variety of types of reactants to produce the gas. In one type of hydrogen generator, at least one reactant is stored in a reservoir as a liquid, and the liquid is transferred from the reservoir to a reaction chamber, where it reacts to produce the desired gas. Various means have been used to transfer the liquid, including gravitational flow, application of pressure to the liquid, wicking the liquid by capillary action, and pumping with a mechanical pump. Each method has advantages and disadvantages.

Pumping the liquid can be advantageous because the pumping can be started and stopped, so gas is produced on an as-needed basis. A pump can also provide the liquid at a controlled rate. In selecting a pump to be used with a gas generator, many factors can be considered, such as compatibility of the pump materials and components with the liquid being pumped, the ability of the pump to withstand the environment in which it is to be used (e.g., temperature and pressure), the size of the pump, the pumping rate, rate control (accuracy and precision), the amount and type of power required to operate the pump, integration of the pump into the gas generator or the system, compatibility of the pump with the method of controlling the production of gas, the reliability of the pump, and the amount of heat and noise produced by the pump during operation.

In view of the above, an object of the present invention is to provide a pump that is suitable for pumping liquid reactant in a gas generator and a fuel cell system including the pump, particularly a fuel cell system that can be used to power portable consumer electronic devices such as communications equipment, portable computers and video games.

SUMMARY

The above objects are met and the above disadvantages of the prior art are overcome by a pump as described below, a hydrogen generator including the pump and a fuel cell system including the hydrogen generator.

Accordingly, one aspect of the present invention is a hydrogen generator including a housing, a liquid reservoir containing a liquid reactant and disposed within the housing, a reaction area disposed within the housing, and a pump configured to pump the liquid reactant from the liquid reservoir, through a liquid flow path to the reaction area, where the liquid is capable of reacting within the reaction area to evolve hydrogen gas. The pump is a diaphragm pump and includes a pump chamber having a volume; a first diaphragm defining a portion of the pump chamber; a liquid inlet path to the pump chamber with an inlet valve disposed therein, the inlet valve biased against a second diaphragm in a closed position; a liquid outlet path from the pump chamber with an outlet valve disposed therein, the outlet valve biased against a third diaphragm in a closed position; a motor with a rotatable shaft; a first cam, a second cam and a third cam, all disposed on the rotatable shaft; a first pushrod in contact with the first cam and configured to cooperate with the first cam to reversibly displace the first diaphragm to reduce the pump chamber volume; a second pushrod in contact with the second cam and configured to cooperate with the second cam to reversibly displace the second diaphragm to open the inlet valve; and a third pushrod in contact with the third cam and configured to cooperate with the third cam to reversibly displace the third diaphragm to open the outlet valve. All valves in the liquid flow path between the liquid reservoir and the reaction area are mechanically operated valves.

Embodiments can include one or more of the following features:
- the first, second and third diaphragms are separate areas of a single diaphragm sheet; the diaphragm sheet can include a crosslinked fluoropolymer;
- the inlet and outlet valves are biased against the second and third diaphragms by an inlet valve spring and an outlet valve spring, respectively.
- the pump includes a pump body within which the pump chamber, the liquid inlet path, and the liquid outlet path are disposed;

a maximum pump chamber volume, defined by a cavity in the pump body and the first diaphragm, is from 0.01 cm$^3$ to 1 cm$^3$;

the pump is configured to operate at up to 100 cycles per minute;

the motor is an electric motor;

the pump is disposed within the hydrogen generator housing;

the pump is disposed outside the hydrogen generator housing;

the liquid includes water; the liquid can be an acid; the liquid can be a base; or the liquid can contain a chemical hydride;

the hydrogen generator has a solid reactant disposed within the reaction area;

the hydrogen generator has a catalyst disposed within the reaction area; and the pump includes a sensor for sensing a predetermined pump position.

A second aspect of the invention is a fuel cell system including the pump and a fuel cell stack. In an embodiment the operation of the pump can be controlled based on a rate of hydrogen evolution required for the fuel cell stack.

These and other features, advantages and objects of the present invention will be further understood and appreciated by those skilled in the art by reference to the following specification, claims and appended drawings.

Unless otherwise specified herein, all disclosed characteristics and ranges are as determined at room temperature (20-25° C.).

The use of spatially relative terms such as "top," "bottom," "above," "below," "over," "under," "up," "down," "front," "rear," "left," "right," and variations thereof is intended for ease of description to describe one element's or feature's relationship to another element or feature as illustrated in the drawings, unless otherwise stated.

DESCRIPTION

Figure 1:
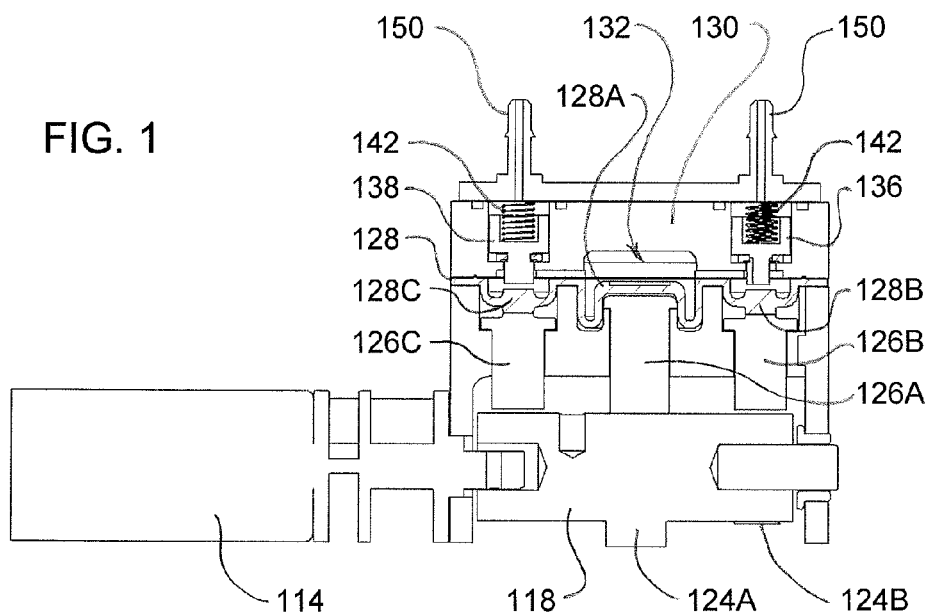
FIG. 1 is a front plan cross-sectional drawing of a pump with the inlet and outlet valves closed.

Commercially available pumps were found to lack desired features for use in a gas generator and fuel cell system. The pump described below is compatible with a variety of liquid reactants for various types of gas generators, including water, acidic and basic aqueous solutions, hydrogen-containing hydrocarbons such as alcohols, and nonaqueous liquids such as hydrazine, depending on the specific materials selected. The pump can be sized to pump liquids at rates over a broad range, can be easily started and stopped, and can pump liquid in either direction, based on the direction in which the pump motor turns. The pump can withstand temperatures, depending on the specific materials selected. The pump will operate quietly so it is not a distraction to the user of the device being powered by the fuel cell system. The pump also has a simple design and low cost.

A pump according to the invention is a motor-driven diaphragm pump with mechanically operated valves. Mechanically operated valves (valves that do not open and/or close in response to pressure) are advantageous because they are positively closed (e.g., by springs), so there is no free flow of liquid in either direction when the valves are closed, even with internal or external overpressure; in fact external overpressure (e.g., from a gas generator) will tend to close the valves even tighter. Because pressure-responsive check valves are not used, the pump is more capable of self-priming at startup. Because the pump is a diaphragm pump with mechanically operated valves, it is not necessary to pinch off rubber tubing to prevent the free flow of liquid like in a peristaltic pump, in which the tubing can deteriorate more quickly. The diaphragm pump with mechanically operated valves also operates quietly.

The pump chamber is sized to allow the pump to provide liquid at the desired maximum rate. The pumping diaphragm and the valves are displaced by cam-driven pushrods. The pushrods that operate the valves are isolated from the valves by sealing diaphragms so the pushrods do not come in contact with the liquid being pumped, thereby protecting them from the liquid, extending the useful life of the pump, and making more alternative and/or less expensive materials feasible. For a pump used in a fuel cell system that powers portable consumer electronics equipment, a pump capable of pumping 1 to 5 cm$^3$ of liquid per minute may be desired. For a pump operating at 60 cycles per minute, this would require a pump chamber with a volume of 0.015 to 0.085 cm$^3$. Fuel cell systems with larger pumps may be too large for equipment that is intended to be carried by the user. Fuel cell systems requiring smaller pumps may not have fuel cell stacks capable of both powering an electronic device as well as the pump motor. In some embodiments the pump can have a maximum operating speed of about 100 cycles per minute.

The motor can be an electric motor, operating on either alternating or direct current. The motor can be powered by a fuel cell stack in the fuel cell system or by another electrical power source in the fuel cell system, the electronic device being by the fuel cell system, or a power source external to the fuel cell system and the electronic device. If desired, the motor and the pump can be reversible. This can be advantageous for more rapidly stopping the flow of liquid, and the resultant generation of gas, for example.

The pump can include a frame that supports the motor, camshaft and other components. The motor rotates the camshaft, which includes three cams, one to lift a pushrod that displaces the pumping diaphragm into the pump chamber, one to lift a pushrod that displaces a seal diaphragm to open an inlet valve, and the other one to lift a pushrod that displaces a seal diaphragm to open an outlet valve. The pumping diaphragm biases the pushrod against the corresponding cam, and the other pushrods are biased against their corresponding cams by the seal diaphragms and valves, each valve being biased against its corresponding seal diaphragm, by a valve spring for example.

The pump includes a liquid inlet path through which liquid can flow to the pump chamber and a liquid outlet path through with liquid can flow from the pump chamber. The inlet valve is disposed such that the liquid inlet path is closed when the inlet valve is in the closed position, and the outlet valve is disposed such that the liquid outlet path is closed when the outlet valve is in the closed position.

In one embodiment the pump chamber can be disposed in a pump body mounted on the pump frame. The pump chamber can be a cavity that can fill with liquid when the pump is in the intake portion of a cycle and into which the pump diaphragm is pushed to force the liquid out of the pump chamber during the discharge portion of the cycle. The volume of the pump chamber is defined by the walls of the cavity and the pump diaphragm. The pump body can also include through-holes in which the inlet and outlet valves are disposed, as well as openings between the through-holes and the pump chamber through which the liquid can flow when the valves are open.

When the pump is in the rest or parked position, all three pushrods are in the down position, the pump diaphragm is retracted to essentially maximize the volume of the pump chamber, and the inlet and outlet valves are closed to prevent liquid flow through the liquid inlet and outlet paths. From the parked position the pump enters the discharge portion of a cycle, in which the inlet valve closes and the pump diaphragm is pushed into the pump chamber as the outlet valve opens, allowing the liquid to be forced out of the pump chamber through the liquid outlet path. After the liquid is discharged from the pump chamber, the pump enters the intake portion of the cycle, in which the outlet valve is closed, the pump diaphragm is displaced into the pump chamber, the inlet valve is opened, and then the pump diaphragm is allowed to retract from the pump chamber, creating a partial vacuum to facilitate the flow of liquid through the liquid inlet path and into the pump chamber. At the end of the intake portion of the cycle the pump returns to the parked position, ready to begin the next cycle.

The peripheral edges of the pump diaphragm and the seal diaphragms can be pressed between the frame and the pump body to retain them in position and provide liquid seals. The diaphragms can be separate components, or they can be separate sections of a single diaphragm component.

The pump can include connectors to provide an external connection between a liquid reservoir and the liquid inlet path and between the liquid outlet path and a reaction chamber. The pump can include other components such as one or more valve covers, seals, fasteners, and so on.

Additional features can be added to the pump. For example, a sensor can be added to detect when the pump is in a particular position, such as bottom dead center, which can be the parked position, as described below. The sensor can sense any of a variety of pump features in a desired position. For example, a magnet can be added to the camshaft so the sensor will detect the magnet when it is in the desired position. A sensor can be used for a number of purposes. For example, a sensor can be used to indicate that the pump is moving as intended, or it can be used as part of a control system to stop the pump in a desired position (e.g., the parked position).

In general it is desirable to use materials that are as inexpensive, light and easy to process as practical. Components that come in contact with the liquid being pumped must be compatible with the liquid, especially for pumps that are intended to be used many times or over prolonged periods of time. While metals can be used, plastics and elastomers can also be suitable for many of the pump components, though metal may be needed for thin parts that require relatively high strength (e.g., valve springs and valve cover). For example, for pumping water or aqueous solutions, heat and solvent resistant thermoplastics such as polyether ether ketone (PEEK) and polyetherimide (PEI) (e.g., ULTEM® PEI from SABIC Americas, Inc.) can be suitable for the pump body; heat and solvent resistant elastomers (e.g., elastomers including a crosslinked fluoropolymer, such as SIFEL® from Shin-Etsu Chemical Co., which has a perfluoropolyether backbone with a terminal silicone crosslinking group) can be suitable for diaphragms and seals; and low friction, high strength, heat resistant polymers such as polytetrafluoroethylene (PTFE) and ethylene-chlorotrifluoroethylene (ECTFE) based polymers (e.g., TURCITE® materials from Trelleborg Sealing Solutions) and bearing grade plastics (e.g., IGLIDE® from muse) can be suitable for valve lifters, camshafts and bushings. Stainless steels are preferred materials for metal components such as valve springs and valve covers that come in contact with the liquid. Aluminum is a suitable metal for parts that do not come in contact with the liquid (e.g., the frame and camshaft).

Figure 3:
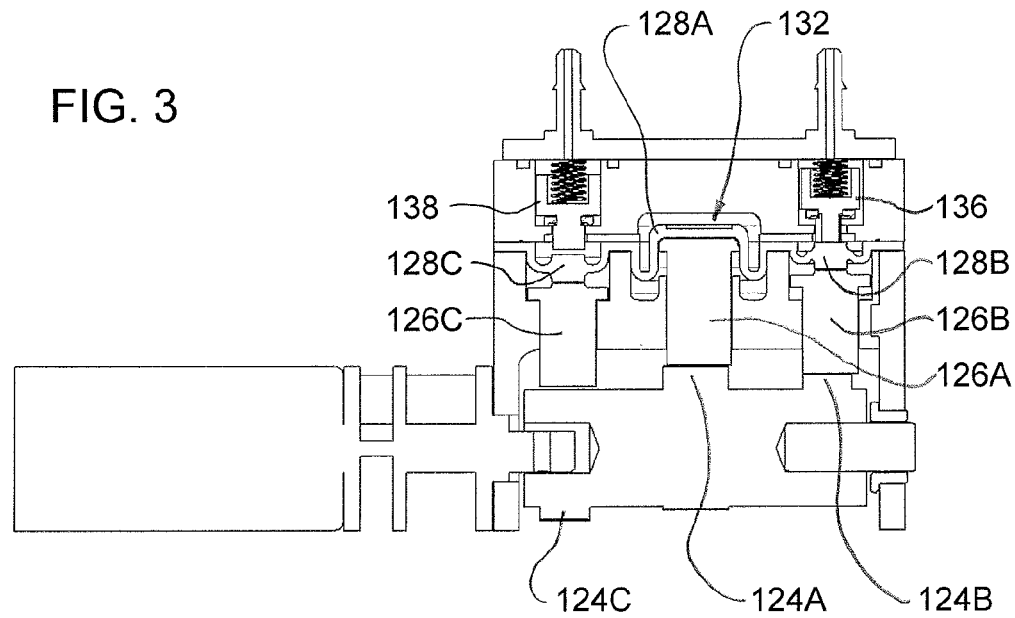
FIG. 3 is a front plan cross-sectional drawing of the pump in FIG. 1 with the inlet valve open.
Figure 4:
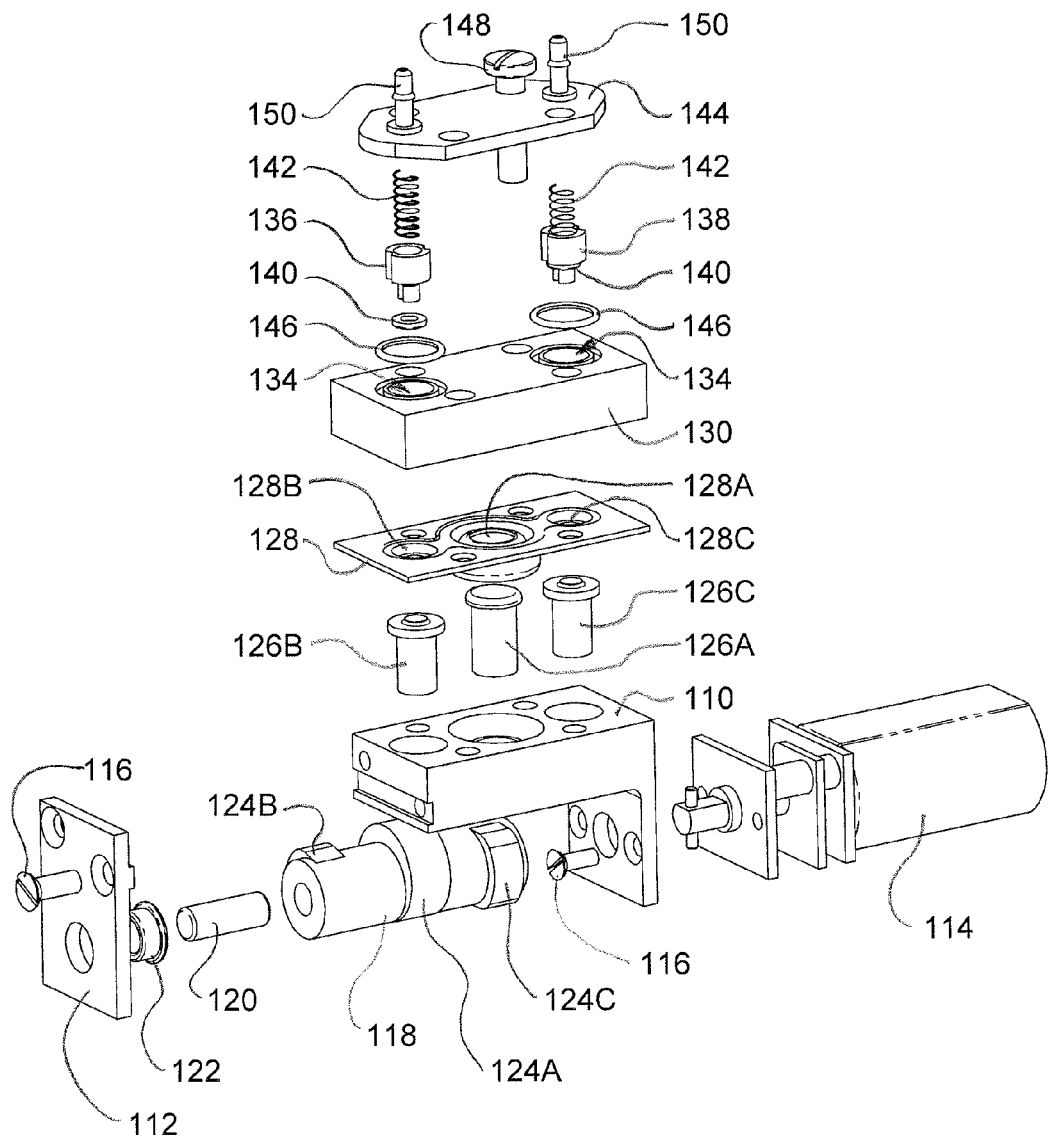
FIG. 4 is an exploded perspective drawing of the pump in FIG. 1.

FIG. 4 is an exploded view of an embodiment of a pump. It includes a frame 110 with an end 112 that can be mounted to the frame 110 with screws 116 (only one screw is shown). The motor 114 can be mounted onto the frame 110 with screws 116 (only one screw is shown). A camshaft 118 can be mounted to the motor 114 and to the frame end 112 with a shaft 120 and a bearing 122. The camshaft 118 has three cams 124A, 124B and 124C that raise pushrods 126A, 126B and 126C as the camshaft 118 is rotated by the motor 114. A pump diaphragm 128A and two seal diaphragms 128B and 128C are disposed between the top of the frame 110 and the bottom of a pump body 130. The diaphragms 128A, 128B and 128C can be separate component or can be formed in a single diaphragm sheet 128. The diaphragms 128A, 128B and 128C isolate the pushrods 126A, 126B and 126C from liquid within the pump body 130. The pump body 130 has a central recess (not shown) in its bottom surface that serves as the pump chamber 132 (FIGS. 1, 2 and 3) and through-holes 134 within which an inlet valve 136 and an outlet valve 138 are disposed. Each of the through-holes 134 has a lower annular lip as a valve seat, and seals 140 on the valves 136 and 138 seal against the valve seats when the valves 136 and 138 are closed. The valves 136 and 138 are biased against the seal diaphragms 128B and 128C by springs 142, which can be disposed between the tops of the valves 136 and 138 and the inside surface of a valve cover 144. O-rings 146 around the through-holes 134 in the pump body 130 provide a seal between the pump body 130 and the valve cover 144. The valve cover 144 is secured to the pump body 130 with screws 148 (only one shown). Connectors 150 provide a sealing connection between the liquid reservoir (not shown) and the liquid inlet path to the pump chamber 130 and between the liquid outlet path from the pump chamber 130 and the gas generator (not shown).

Figure 2:
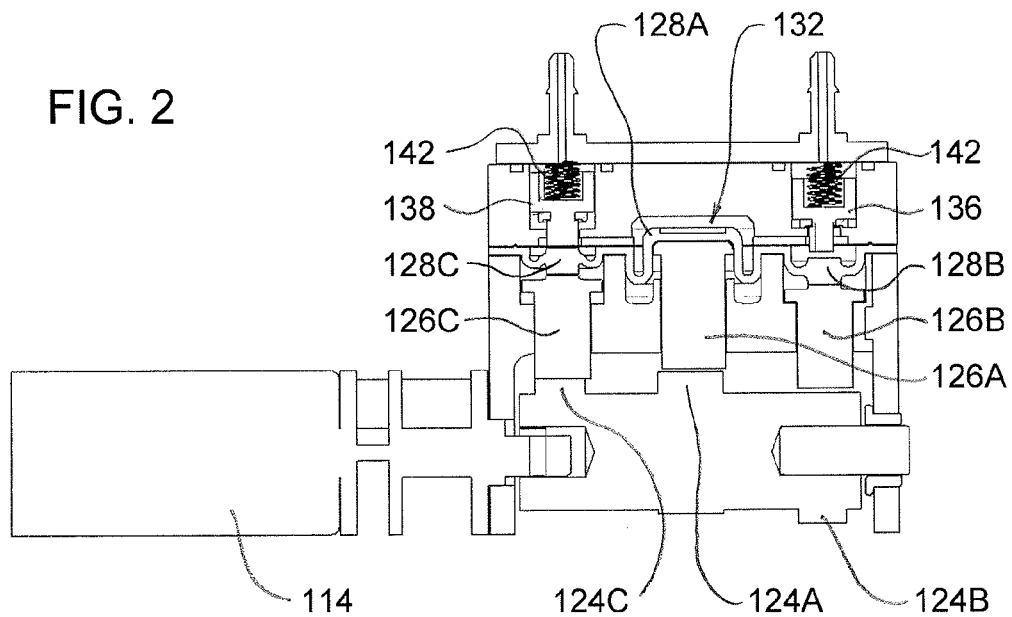
FIG. 2 is a front plan cross-sectional drawing of the pump in FIG. 1 with the outlet valve open.

FIGS. 1, 2 and 3 are cross sectional drawings of the pump shown in FIG. 4 (as viewed from the rear as oriented in FIG. 4), with the pump in various positions. In FIG. 1 the pump is in the parked position. In the parked position the pushrods 126A, 126B and 126C are all in the full down position so that the inlet valve 136 and outlet valve 138 are both closed, and the volume of the pump chamber 132 is at its maximum. In this position the diaphragms 128A, 128B and 128C are in or close to a relaxed state, in order to minimize deterioration, and liquid is not able to flow into or out of the pump. The pump moves from the parked position to the discharge portion of a cycle. In FIG. 2 the pump is in the discharge portion of a cycle. During the discharge portion of the cycle, pushrod 126C and seal diaphragm 128C are raised, opening the outlet valve 138, and the pump pushrod 126A and pump diaphragm 128A are raised, forcing liquid from the pump chamber 138 and out through the liquid outlet path. In FIG. 2 the pump is in the discharge portion of a cycle, with the outlet valve 138 open and the pump diaphragm 128A ascending. At the end of the discharge portion of the cycle, the pump begins the intake portion of the cycle (FIG. 3). During the intake portion of the cycle, the pump cam 124B raises pushrod 126B and seal diaphragm 128B to open inlet valve 136 and allow liquid to flow in through the liquid inlet path to the pump chamber 132. Pump cam 124A and pump diaphragm 128A then lower, to draw liquid into the pump chamber 132. As shown in FIG. 3 the inlet valve 136 is fully open and the pump diaphragm 128A is descending. At the end of the inlet portion of the cycle, the pump is again in the parked position (FIG. 1). The pump diaphragm 128A is in its lowest position, the pump chamber 132 is filled with liquid, and the inlet valve 136 and outlet valve 138 are both closed.

The pump can be used to pump liquid from a reservoir to a reaction area in a gas generator, such as a hydrogen generator that provides hydrogen gas to a fuel cell stack. The hydrogen generator and fuel cell stack are part of a fuel cell system that can be used to provide electric power to an electronic device.

The hydrogen generator can use a variety of reactants and types of reactions. At least one reactant is a hydrogen-containing compound. Hydrogen containing compounds include hydrides such as metal hydrides (e.g., sodium hydride, lithium hydride, lithium aluminum hydride), transition metal hydrides (e.g., aluminum hydride), organic (saline or ionic) hydrides (e.g., $C_6H_5C(O)CH_3$), borohydrides (e.g., sodium borohydride, ammonia borane), borates (e.g., sodium metaborate), alcohols (e.g., methanol, ethanol), organic acids (e.g., formic acid), and water. At least one reactant is a liquid or is contained in a liquid that is stored in a reservoir within the hydrogen generator. A catalyst can be used to catalyze the hydrogen-generation reactions within the reaction area.

The pump can be located within or outside the hydrogen generator housing. If it is within the housing, fewer connections are needed between the housing and the remainder of the fuel cell system, but if the hydrogen generator is not reusable (e.g., by recharging it with fresh reactants), the cost of hydrogen generation is increased. For disposable hydrogen generators, it is generally desirable to locate the pump outside the hydrogen generator, where it can be used many times.

The pump can be used to control the supply of liquid to the reaction area (and the rate of hydrogen generation). For example, the pump can be operated continuously or intermittently so hydrogen is produced only as needed. Need can be determined based on one or more device characteristics (e.g., on/off, operating mode, rate of energy consumption, internal battery condition), fuel cell characteristics (e.g., voltage, amperage, power output, hydrogen gas pressure, temperature), hydrogen generator characteristics (e.g., hydrogen gas pressure, temperature), or a combination thereof. A control system can be included in the device and/or the fuel cell system for monitoring these characteristics and controlling the operation of the pump (e.g., by turning the motor on and off or by adjusting the motor speed).

Figure 5:
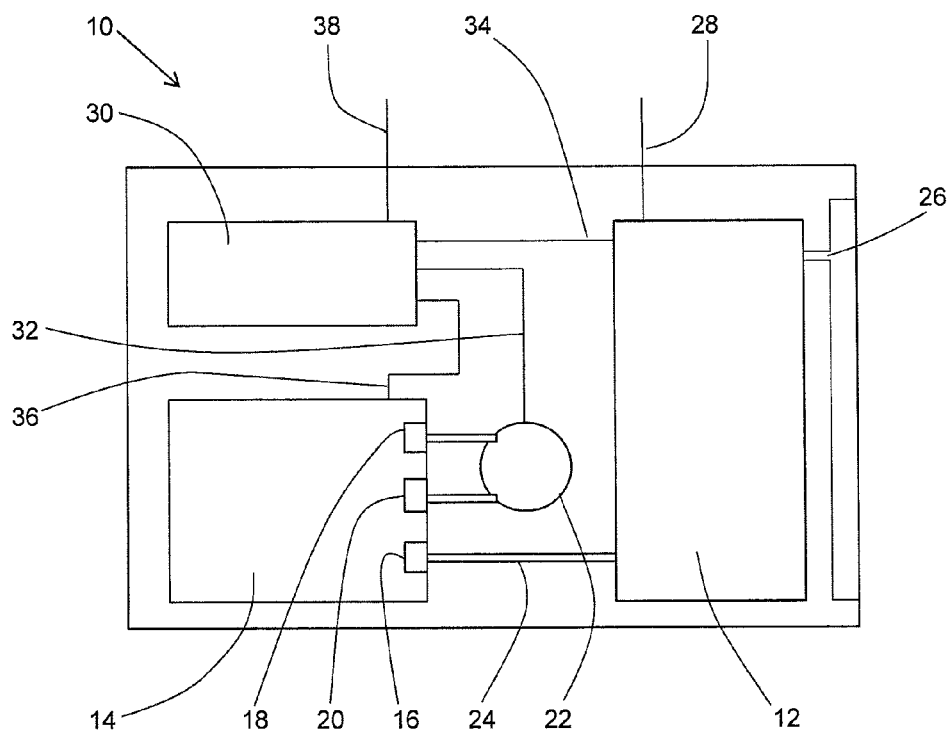
FIG. 5 is a schematic diagram of a fuel cell system including a pump.

FIG. 5 is a schematic diagram of an embodiment of a fuel cell system. Not all components are essential, and components of the fuel cell system are not necessarily-disposed as shown in FIG. 1 (e.g., some components may be located within an apparatus powered by the fuel cell system). Fuel cell system 10 includes a fuel cell stack 12 and a removable hydrogen generator 14 for providing hydrogen fuel to the stack 12. The hydrogen passes through an outlet valve 16 in the hydrogen generator 14, and through an inlet 24 to the stack 12, where it is used as a fuel by the anode. Another gas, such as oxygen, enters the stack 12 through an inlet 26, where it is used as oxidant by the cathode. The stack 12 produces electricity that is provided to an electric apparatus through a power output 28. Reactants within the hydrogen generator 14 react to produce the hydrogen. A liquid in the hydrogen generator 14 is transferred from a reservoir to a reactant area where the hydrogen is generated. The liquid is transferred by a pump 22, which can be disposed within or outside the hydrogen generator housing. If the pump 22 is within the housing, fewer external connections are needed, but if the pump 22 is an external pump, it can continue to be used after the used hydrogen generator 14 is replaced. In FIG. 5 the pump 22 is shown outside the hydrogen generator 14. The liquid can be pumped out of the hydrogen generator 14 through an outlet valve 18 and back into the hydrogen generator 14 through an inlet valve 20. The fuel cell system 10 can include an optional control system for controlling the operation of the gas generator 14 and/or the fuel cell stack 12. Components of the control system can be disposed in the hydrogen generator 14, the fuel cell stack 12, the apparatus powered by the fuel cell system, or a combination thereof. The control system can include a controller 30. Although the controller 30 can be located within the fuel cell system 10, as shown in FIG. 5, it can be elsewhere in the fuel cell system 10 or within the electric apparatus for example. The controller 30 can communicate through a communication line 32 with the pump 22, through a communication line 34 with the stack 12, through a communication line 36 with the hydrogen generator 14, and/or through a communication line 38 with the device. Sensors for monitoring voltage, current, temperature, pressure and other parameters can be disposed in or in communication with those components so gas generation can be controlled based on those parameters.

Example 1

A pump was manufactured according to the embodiment shown in FIG. 4 for pumping water and acidic aqueous solutions. A 5 volt direct current motor and a machined aluminum camshaft were mounted onto a machined aluminum frame. Machined TURCITE® pushrods and a molded SIFEL® diaphragm sheet were used. The pump body was machined from a block of ULTEM®. The valve springs were made from 316 stainless steel, and the valve cover was 304 stainless steel.

The maximum volume of the pump chamber in the pump body was 0.06 cm$^3$ with the pump in the parked position. The pump was able to deliver 0.04 cm$^3$/cycle with the pump operating at 66 cycles/minute. The pump was also able to generate a suction of 3 psi (211 g/cm$^2$), to draw liquid from the reservoir for priming, and 8 psi (562 g/cm$^2$) of discharge pressure.

Example 2

The pump from Example 1 was used with a hydrogen generator. The hydrogen generator included a liquid reservoir containing water within a housing. The pump was located outside the hydrogen generator, with a liquid feed line extending from the reservoir, through an outlet in the housing, to the pump, and a liquid supply line extending from the pump, through an inlet in the housing to a reaction area containing a solid mixture of sodium borohydride and acid. Water pumped to the reaction area reacted with the sodium borohydride in the presence of the acid to produce hydrogen gas. The hydrogen gas was supplied as the fuel to a hydrogen-oxygen fuel cell stack.

While a pump according to the invention is suitable for pumping liquid for a hydrogen generator, it may also be suitable for use in other applications.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A hydrogen generator comprising
a housing;
a liquid reservoir containing a liquid reactant and disposed within the housing;
a reaction area disposed within the housing; and
a pump configured to pump the liquid reactant from the liquid reservoir, through a liquid flow path to the reaction area;
wherein the liquid is capable of reacting within the reaction area to evolve hydrogen gas;
wherein the pump is a diaphragm pump and comprises:
a pump chamber having a volume;
a first pump diaphragm defining a portion of the pump chamber;
a liquid inlet path to the pump chamber with an inlet valve disposed therein, the inlet valve biased against a second seal diaphragm in a closed position;
a liquid outlet path from the pump chamber with an outlet valve disposed therein, the outlet valve biased against a third seal diaphragm in a closed position;
a motor with a rotatable shaft;
a first cam, a second cam and a third cam, all disposed on the rotatable shaft;
a first pushrod in contact with the first cam and configured to cooperate with the first cam to reversibly displace the first pump diaphragm to reduce the pump chamber volume;
a second pushrod in contact with the second cam and configured to cooperate with the second cam to reversibly displace the second seal diaphragm to open the inlet valve; and
a third pushrod in contact with the third cam and configured to cooperate with the third cam to reversibly displace the third seal diaphragm to open the outlet valve; and
wherein:
the second seal diaphragm is disposed between the second pushrod and the inlet valve;
the third seal diaphragm is disposed between the third pushrod and the outlet valve;
when the inlet valve is open, the second seal diaphragm is disposed farther from a longitudinal central axis of the rotatable shaft when the inlet valve is open than when the inlet valve is closed;
when the outlet valve is open, and the third seal diaphragm is disposed farther from the longitudinal central axis of the rotatable shaft when the outlet valve is open than when the outlet valve is closed; and
all valves in the liquid flow path between the liquid reservoir and the reaction area are mechanically operated valves.

2. The hydrogen generator of claim 1, wherein the first, second and third diaphragms are separate areas of a single diaphragm sheet.

3. The hydrogen generator of claim 2, wherein the diaphragm sheet comprises a crosslinked fluoropolymer.

4. The hydrogen generator of claim 1, wherein the inlet and outlet valves are biased against the second and third seal diaphragms by an inlet valve spring and an outlet valve spring disposed within the inlet and outlet valves, respectively.

5. The hydrogen generator of claim 1, wherein the pump comprises a pump body within which the pump chamber, the liquid inlet path, and the liquid outlet path are disposed.

6. The hydrogen generator of claim 1, wherein a maximum pump chamber volume, defined by a cavity in the pump body and the first diaphragm, is from 0.01 cm$^3$ to 1 cm$^3$.

7. The hydrogen generator of claim 1, wherein the pump is configured to operate at up to 100 cycles per minute.

8. The hydrogen generator of claim 1, wherein the motor is an electric motor.

9. The hydrogen generator of claim 1, wherein the pump is disposed within the hydrogen generator housing.

10. The hydrogen generator of claim 1, wherein the pump is disposed outside the hydrogen generator housing.

11. The hydrogen generator of claim 1, wherein the liquid comprises water.

12. The hydrogen generator of claim 11, wherein the liquid comprises an acid.

13. The hydrogen generator of claim 11, wherein the liquid comprises a base.

14. The hydrogen generator of claim 11, wherein the liquid comprises a chemical hydride.

15. The hydrogen generator of claim 1, wherein the hydrogen generator comprises a solid reactant disposed within the reaction area.

16. The hydrogen generator of claim 1, wherein the hydrogen generator comprises a catalyst disposed within the reaction area.

17. The hydrogen generator of claim 1, wherein the pump comprises a sensor for sensing a predetermined pump position.

18. A fuel cell system comprising a fuel cell stack and a hydrogen generator according to claim 1.

19. The fuel cell system of claim 18, wherein the pump can be operated to supply hydrogen as needed by the fuel cell stack.

20. The hydrogen generator of claim 1, wherein the pump has a single pump chamber and the first pump diaphragm is the only pump diaphragm.

21. The hydrogen generator of claim 1, wherein the inlet and outlet valves are not pinch type valves.

* * * * *